United States Patent [19]
Jolliff

[11] Patent Number: 4,513,524
[45] Date of Patent: Apr. 30, 1985

[54] FISHING LINE RELEASE MECHANISM

[76] Inventor: William L. Jolliff, 640 Holt Rd., Webster, N.Y. 14580

[21] Appl. No.: 497,090

[22] Filed: May 23, 1983

[51] Int. Cl.³ .............................................. A01K 97/00
[52] U.S. Cl. .................................. 43/43.12; 43/43.13
[58] Field of Search ................. 43/43.12, 43.87, 43.88, 43/43.90, 43.91, 43.92, 43.13; 24/115 F, 136 R, 136 L

[56] References Cited

U.S. PATENT DOCUMENTS

| | | | |
|---|---|---|---|
| 3,008,259 | 11/1961 | Zornes | 43/43.12 |
| 3,081,575 | 3/1963 | Meisner | 43/43.12 |
| 3,765,118 | 10/1973 | Reitler | 43/43.12 |
| 3,818,624 | 6/1974 | Duffy | 43/43.13 |
| 3,925,920 | 12/1975 | Walker | 43/43.12 |
| 4,028,840 | 6/1977 | Wille | 43/43.12 |

Primary Examiner—Kuang Y. Lin
Assistant Examiner—M. Jordan
Attorney, Agent, or Firm—Lawrence P. Kessler

[57] ABSTRACT

A simple, readily adjustable, mechanism for releasably connecting a fishing line to a member such as an outrigger, downrigger or side planer tow line. The release mechanism includes a body selectively secured to such member. A pair of elements, at least one of which is resilient, is associated with the body. The elements are adjustably urged into intimate contact. A fishing line, receivably held between the elements, is released by exertion of a preselected tension on such line when a fish is hooked.

9 Claims, 3 Drawing Figures

4,513,524

FISHING LINE RELEASE MECHANISM

BACKGROUND OF THE INVENTION

This invention relates generally to a fishing line release mechanism for use with side planers or outriggers, and more particularly to a fishing line release mechanism of simple construction which is easy to use and readily adjustable.

In certain methods of fishing, it is desirable to locate a trolling line away from the fishing boat either to provide room for additional lines or to keep the bait or lure from following directly in the path of the boat. To provide for such remote location, outriggers, downriggers or side planers (skiis) extend from the side of the boat. The trolling line, or lines, are coupled to the outriggers, downriggers or tow lines of the side planers by release mechanisms which secure the trolling line during fishing and release a trolling line when a fish is hooked. Prior release mechanisms range from spring loaded clamps, which are difficult to adjust for varying fishing conditions, to complex and expensive releases such as shown in U.S. Pat. No. 3,800,458 issued Apr. 2, 1974 in the name of Swanby for example.

SUMMARY OF THE INVENTION

This invention is directed to a simple, readily adjustable, mechanism for releasably connecting a fishing line to a member such as an outrigger, downrigger or side planer tow line. The release mechanism includes a body selectively secured to such member. A pair of elements, at least one of which is resilient, is associated with the body. The elements are adjustably urged into intimate contact. A fishing line, receivably held between the elements, is released by exertion of a preselected tension on such line when a fish is hooked.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
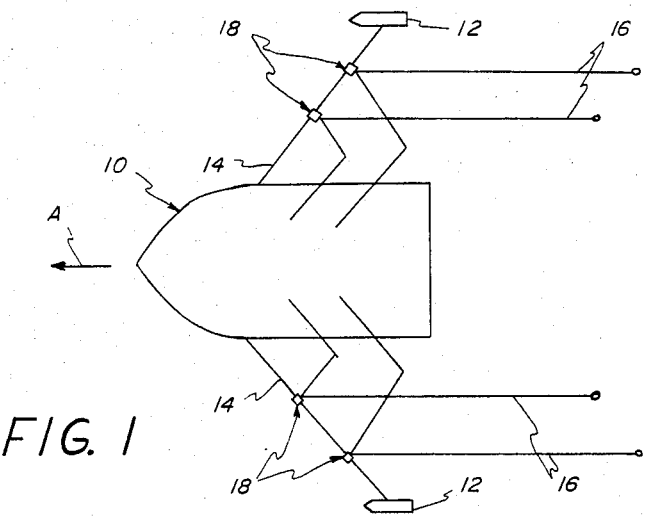
FIG. 1 is a schematic view of fishing boat employing the side planer method of fishing.

Referring now to the accompanying drawings, an examplary method of fishing in which fishing line release mechanisms can be employed is schematically depicted in FIG. 1. In this method, referred to as side planer fishing, a fishing boat 10, traveling in the direction indicated by arrow A, has outboard side planers 12 coupled thereto by tow lines 14. The forward motion of the boat through the water maintains the spacing of the side planers to the boat with the tow lines taught. A plurality of fishing lines 16 are then respectively secured to the tow lines 14 by release mechanisms 18 according to this invention. The lines 16 are thus positioned outwardly from the boat 10 so as to extend away from the sides of the boat. Of course, the release mechanisms 18 are suitable for any other fishing method where remote release of the fishing line is desirable.

Figure 2:
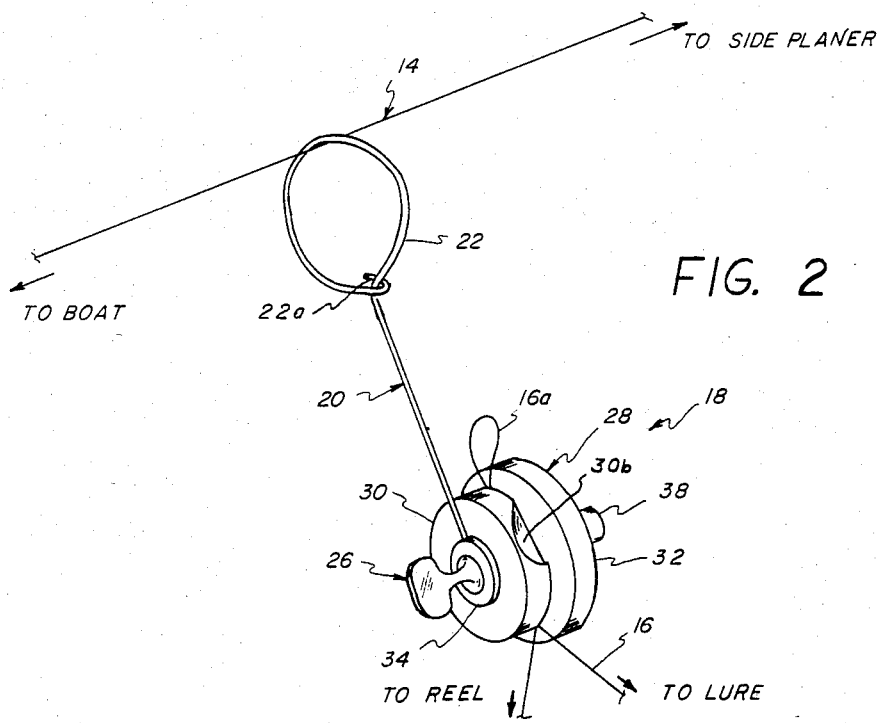
FIG. 2 is a view, in perspective, of the fishing line release mechanism according to this invention secured to a tow line.
Figure 3:
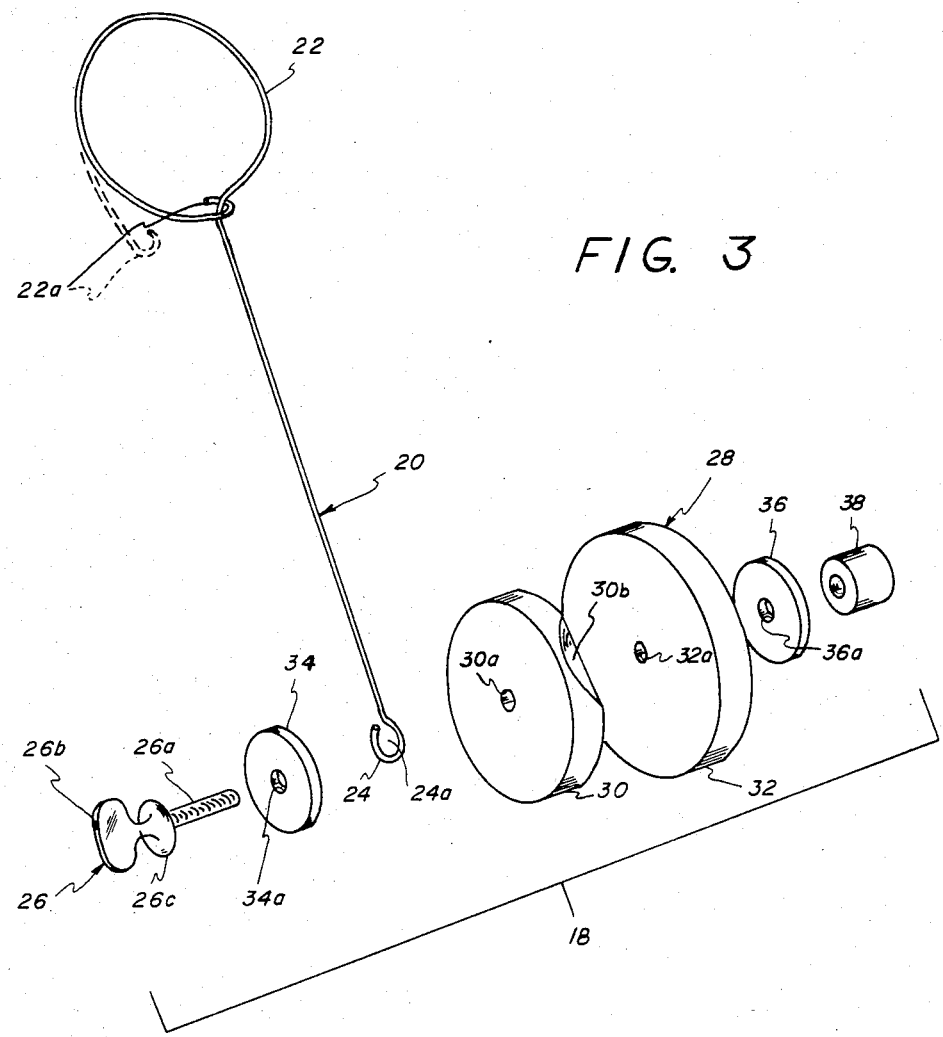
FIG. 3 is an exploded view, in perspective and on an enlarged scale, of the fishing line release mechanism of FIG. 2.

The release mechanism 18, as best shown in FIGS. 2 and 3, includes a body 20, a support member 26, and a fishing line receiver assembly 28. The body 20 is formed of an elongated substantially rigid wire, for example. The body 20 has a large loop 22 formed in one end and a substantially smaller loop 24 formed in the opposite end. The loop 22 has a sharply bent portion 22a at the end thereof. The portion 22a is engageable with an intermediate portion of the body 20 to hold the loop in a closed position (shown in solid lines in FIGS. 2 and 3). Due to the limited resilience of the wire, the portion 22a is movable to an open position (shown in broken lines in FIG. 3) to enable the loop 22 to be readily slipped over a tow line 14 and then closed to secure the mechanism 18 to the tow line.

The support member 26 has a screw threaded portion 26a, upon which the fishing line receiver assembly 28 is mounted, and a hand engageable portion 26b. The receiver assembly 28 includes a pair of substantial disk-shaped elements 30, 32, formed for example of resilient open cell dense foam material. The elements 30, 32 have openings 30a, 32a, along their respective longitudinal axes of a diameter less than the diameter of the threaded portion 26a of the support member 26. Because of the relationship of the respective diameters of the openings to the diameter of the threaded portion, the elements 30, 32 are relatively securely held on the threaded portion 26a when such portion is inserted through the openings coincident with the longitudinal axes of such elements. A pair of pressure pads or washers 34, 36 are located on the threaded portion 26a outboard of the elements 30, 32. The washers 34, 36 have respective openings 34a, 36a of a diameter greater than the diameter of the threaded portion. Accordingly, the washers are free to move axially along the threaded portion 26a while being supported by such portion.

The smaller loop 24 of the body 20 defines an opening 24a (see FIG. 3) of sufficient diameter to accept the threaded portion 26a. On assembly, the threaded portion 26a passes through the loop 24 which is located between washer 34 and element 30. A clinch nut 38 is mounted on the threaded portion 26a outboard of washer 36. Thus, when the hand engageable portion 26b of the support member 26 is rotated, the washers 34, 36 are urged together between the clinch nut 38 and a flange 26c on the portion 26b. That is, rotation of the threaded portion 26a by the hand engageable portion 26b moves the clinch nut 38 along the axis of the portion 26a. The clinch nut, in turn, causes translational movement of the washer 36 toward the washer 34 abutting the flange 26c to compress the elements 30, 32. Due to the resilience of elements 30, 32, adjustment of such portion 26b readily sets the thrust loading on the elements 30, 32 by compression of the elements between the washers.

Element 30 may be of a lesser diameter than element 32 and desirably has a notch 30b formed in its peripheral surface. Such notch, and the relationship of diameters of the elements, facilitates insertion of a fishing line 16 between elements 30, 32. Of course any other arrangement for facilitating insertion of the fishing line (e.g. chamferring one or both of the facing surfaces of the elements 30, 32) is suitable for use with the mechanism 18 of the invention. In operation, a loop 16a is hand formed in a fishing line 16 and such loop is readily inserted between the elements 30, 32 of the release mechanism 18. The hand engageable portion 26b is conveniently rotated to set the desired thrust loading on the elements such that the line 16 is retained between the elements until a preselected tension is applied to the line by a fish being hooked. Such preselected tension is of course dependent upon the type of fish being sought and the conditions under which fishing is taking place (e.g. speed of boat, current, depth of lure).

Portion 22a of loop 22 is then opened, the loop 22 is placed over a tow line 14, and portion 22a is closed to secure the release mechanism 18 to the tow line. The release mechanism is then fed out a desired distance from the boat along the tow line where it remains until the fishing line is released when a fish is hooked. In a similar manner, additional fishing lines 16 in respective release mechanisms 18 may be secured to the tow lines 14. Placement of the release mechanism 18 on the line 14 as shown in FIG. 2 locates the portion 22a such that snagging of fishing lines 16 in adjacent release mechanism is substantially prevented. Of course the loop 22 retains the release mechanism 18 on the tow line after the fishing line is released so that it can be readily recovered for reuse. Moreover, the use of the loop 22 to secure the release mechanism to the tow line 14, enables the mechanism to be oriented by tension in the fishing line 16 so that the fishing line lies in the plane of intimate contact between the elements 30 and 32. Such orientation makes the setting of the preselected tension easier, in that the adjusted thrust loading need not have to compensate for a variable component of the tension perpendicular to the plane between the elements caused by the fishing line moving laterally with respect to the release mechanism.

The invention has been described in detail with particular reference to a preferred embodiment thereof, but it will be understood that variations and modifications can be effected within the spirit and scope of the invention.

I claim:

1. A mechanism for releasably connecting a fishing line to an extension member, said mechanism comprising:

an elongated, substantially rigid, wire formed body including an open loop in one end thereof, said open loop having a substantially resilient portion adapted to releasably engage an intermediate portion of said body, so that said open loop can be threaded over said extension member and then said resilient portion can be engaged with said intermediate body portion whereby said body is selectively couplable to said extension member and, once coupled to said extension member is movable with respect such extension member to a desired location there along; and means, associated with said body, for receiving a fishing line, said means including a pair of juxtaposed elements, and hand engagable means for adjustably urging said elements manually into intimate contact, whereby (i) a fishing line can be received therebetween, and (ii) such line can be released therefrom by exertion of a preselected tension on such line.

2. The invention of claim 1 wherein said pair of elements are substantially disk-shaped, and wherein said hand engagable urging means includes a pair of pressure members respectively in intimate contact with the outboard surfaces of said elements, and means for selectively moving said pressure members manually toward and away from one another for establishing a desired thrust loading on said elements.

3. The invention of claim 2 wherein said selective moving means includes a screw thread having a hand engagable head and a thread body passing through said elements substantially coincident with the longitudinal axes of such elements, said thread body being in fixed relation to one pressure member and coupled to the other pressure member to effect translational movement thereof when said head is manually rotated.

4. The invention of claim 3 wherein said body further includes a second loop formed in the end opposite said open loop, said second loop being supported on said screw thread.

5. In a fishing arrangement where at least one fishing line is desirably positioned away from the side of a fishing boat by a mechanism for releasably connecting such fishing line to a member extending outwardly from the side of such boat, said mechanism comprising:

an elongated body including an open loop portion in one end releasably engageble with an intermediate portion of said body, said open loop being adapted to selectively receive said member to couple said body thereto and, once coupled to said member, enable said body to be movable with respect to said member to a desired location there along; and a fishing line receiving assembly including a pair of juxtaposed elements, and means for urging said elements into intimate contact, said urging means including means for supporting said body and said pair of elements, said supporting means having hand engagable means operatively coupled to said elements for manually adjustably controlling the thrust loading on said elements, whereby (i) a fishing line is readily receivable between said elements, and (ii) such line is released from between said elements by exertion of a preselected tension on such line.

6. The invention of claim 5 wherein said pair of elements are formed of substantially disk-shaped dense foam material, and said urging means further includes pressure pads respectively in intimate contact with the outboard surfaces of said elements.

7. The invention of claim 6 wherein said supporting means comprises a screw thread having a hand engagable head and a thread body passing through said elements substantially coincident with the longitudinal axes of said elements, said thread body having a portion engaging one of said pressure pads to prevent relative movement therebetween when said head is manually rotated, and having a portion engaging to other of said pressure pads to effect relative translational movement therebetween when said head is manually rotated.

8. The invention of claim 5 wherein at least one element includes means for facilitating receipt of a fishing line between said elements.

9. The invention of claim 8 wherein said facilitating means is a notch formed in the peripheral surface of at least one of said elements.

* * * * *